No. 765,956. PATENTED JULY 26, 1904.
W. C. BUCKNAM.
VARIABLE SPEED TRANSMISSION MECHANISM.
APPLICATION FILED JUNE 8, 1903.
NO MODEL.
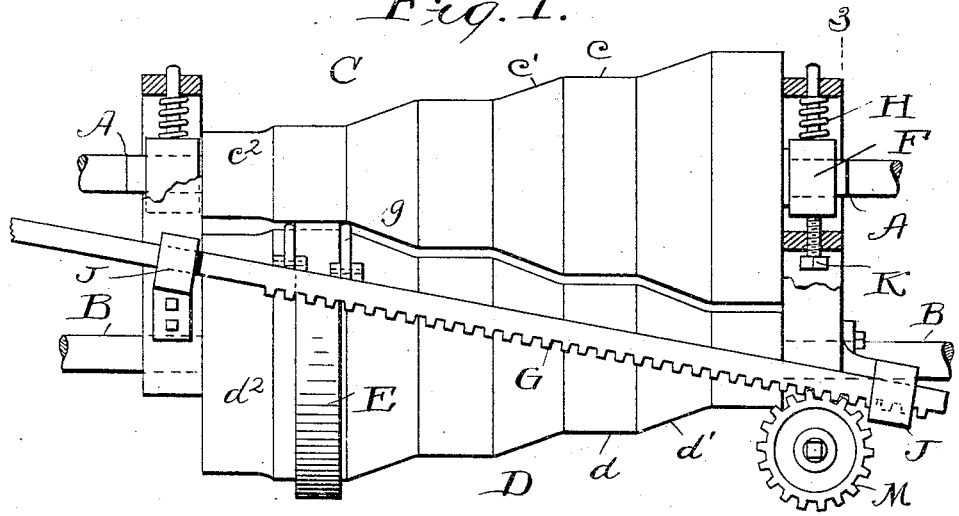
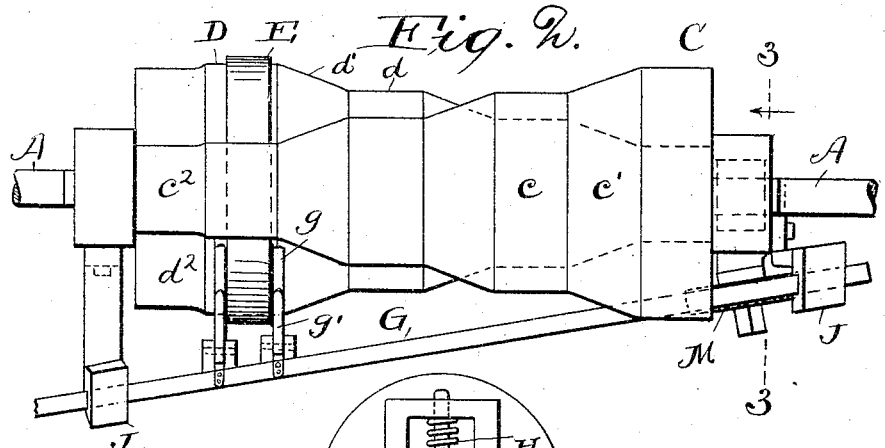
Witnesses.
E. B. Gilchrist
N. L. Brennan
Inventor:
Worthy C. Bucknam,
By his Attorneys,
Thurston & Bates.

No. 765,956.

Patented July 26, 1904.

UNITED STATES PATENT OFFICE.

WORTHY C. BUCKNAM, OF GENEVA, OHIO.

VARIABLE-SPEED-TRANSMISSION MECHANISM.

SPECIFICATION forming part of Letters Patent No. 765,956, dated July 26, 1904.

Application filed June 8, 1903. Serial No. 160,465. (No model.)

*To all whom it may concern:*

Be it known that I, WORTHY C. BUCKNAM, a citizen of the United States, residing at Geneva, in the county of Ashtabula and State of Ohio, have invented a certain new and useful Improvement in Variable-Speed-Transmission Mechanism, of which the following is a full, clear, and exact description, reference being had to the accompanying drawings.

The object of the invention is to drive a shaft at any of several speeds from a driving-shaft whose speed is constant and to effect this result by simple mechanism which does not include spur-gearing and which permits the speed of the driven shaft to be changed without sensible jar or shock.

The invention consists in the construction and combination of parts hereinafter described, and pointed out definitely in the claims.

In the drawings, Figure 1 is a side elevation of mechanism embodying my invention. Fig. 2 is a top view of the same. Fig. 3 is a sectional end view in plane indicated by line 3 3 of Figs. 1 and 2.

Referring to the parts by letters, A includes the driving-shaft, and B a parallel driven shaft. On the driving-shaft is secured a member C in the form of a cone-pulley, whose several cylindrical surfaces $c$ are joined by inclined or conical surfaces $c'$. On the driven shaft is secured another similarly-shaped cone-pulley D, which is placed in the reverse direction, so that the cylindrical surface $d$ thereon of largest diameter is opposite to the smallest cylindrical surface on the other cone-pulley. By reason of the described construction and arrangement it is clear and is also apparent from the drawings that the distances between the opposed surfaces of these two cone-pulleys both in their cylindrical and conical parts are substantially the same in all points.

E represents a friction-belt which embraces one of these cone-pulleys, preferably the cone-pulley D on the driven shaft, and the diameter of this belt is somewhat greater than the diameter of the largest cylindrical part of said cone-pulley. This belt is of such thickness that as it passes between the two cone-pulleys it will have such frictional contact with both that it will serve as the medium by which motion is transmitted from one to the other. In order that this result may be effected practically and certainly, and in order to facilitate the movement of this belt between the conical parts of said cone-pulleys, one of these shafts, preferably the driving-shaft A, is mounted in boxes F, which are movable toward and from the bearings for the other shaft. Springs H act to move these bearing-boxes toward the other bearings as far as possible, which movement is limited by set-screws K, with which said boxes engage. These springs permit the member C to yield enough to allow the belt to be passed between the conical parts of the members C and D, and they also act to force the member C toward the member B with force enough to insure proper frictional contact between said members and the belt.

The belt may be moved lengthwise of these shafts from one cylindrical surface to another by any suitable belt-shipper. That shown consists of a longitudinal movable rack-bar G, slidably mounted in bearings J, said rack-bar being placed in such position that at all points it is substantially the same distance from the space between said two members C and D. Two fingers $g$ $g$ are pivoted to this rack-bar, and they lie on opposite sides of the belt and are independently held in contact with the surface of the member D by means of springs $g'$. The rack-bar is moved by means of a spur-gear M. The opposed cylindrical surfaces $c^2$ $d^2$ at one end of these two cone-pulleys, and preferably at the small end of the driving-pulley, are a distance apart which is greater than the thickness of the belt, and therefore when it is not desired to transmit motion from one of these cone-pulleys to the other the belt is moved onto the cylindrical surface $d^2$, and when in this position it does not transmit motion to pulley C. When it is desired to drive the shaft B, the belt is moved by the belt-shipper lengthwise of the cone-pulley D and onto that cylindrical surface thereon which by coöperating with the opposed cylindrical surface *c* on the other cone-pulley and the intermediate belt will cause the shaft B to rotate at the desired speed.

Having described my invention, I claim—

1. In transmission mechanism, the combination of two rotatable cone-pulleys which are reversely placed and are mounted on parallel axes, each having a plurality of cylindrical surfaces of different diameters, and intermediate inclined surfaces, with a frictional endless belt embracing one of the cone-pulleys and running between it and the other, the belt being of such thickness that it will be gripped between the pulleys, and means for shifting the belt, substantially as and for the purpose specified.

2. In transmission mechanism, the combination of two rotatable cone-pulleys which are reversely placed and mounted on parallel axes, each pulley having a plurality of cylindrical surfaces of successively smaller or larger diameters and intermediate conical surfaces terminating at the adjacent cylindrical surfaces, with a frictional endless belt embracing one of the cone-pulleys and running between it and the other, the belt being of such thickness that it will be gripped between the pulleys, means for shifting the belt, and springs to allow one pulley to give backward slightly during such shifting, substantially as and for the purpose specified.

In testimony whereof I hereunto affix my signature in the presence of two witnesses.

W. C. BUCKNAM.

Witnesses:
 HENRY MEANS,
 CHAS. E. CARTER.